G. ROBINSON.
WRENCH.
APPLICATION FILED MAR. 23, 1921.

1,433,153.

Patented Oct. 24, 1922.

Inventor
George Robinson
By Chas. E. Townsend
Attorney

Patented Oct. 24, 1922.

1,433,153

UNITED STATES PATENT OFFICE.

GEORGE ROBINSON, OF BERKELEY, CALIFORNIA, ASSIGNOR OF ONE-THIRD TO HENRY I. TODD, AND ONE-THIRD TO JAMES F. HURST, BOTH OF BERKELEY, CALIFORNIA.

WRENCH.

Application filed March 23, 1921. Serial No. 454,653.

*To all whom it may concern:*

Be it known that I, GEORGE ROBINSON, a citizen of the United States, residing at Berkeley, in the county of Alameda and State of California, have invented new and useful Improvements in Wrenches, of which the following is a specification.

This invention relates to a wrench, and especially to that type known as "Alligator Wrenches."

One of the objects of the present invention is to generally improve and simplify the construction of alligator wrenches, and especially to provide a structure which permits quick adjustment of the jaws and which is provided with means for rigidly securing the jaws in adjusted position.

Another object of the invention is to provide means for readily releasing the jaws when in adjusted position, and for automatically returning the jaws to a position of maximum separation when released.

Further objects will hereinafter appear.

The invention consists of the parts and the construction, combination and arrangement of parts as hereinafter more fully described and claimed, having reference to the accompanying drawings, in which—

Figure 1:
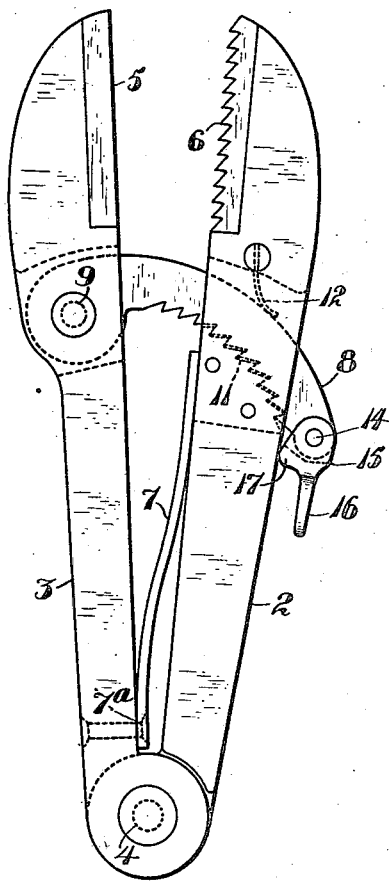
Fig. 1 is a side elevation of the wrench.
Figure 2:
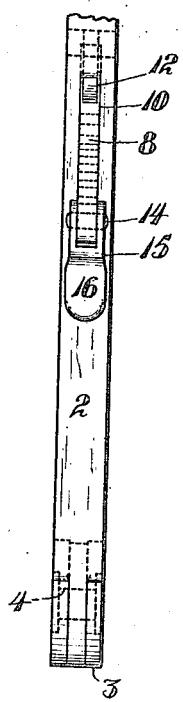
Fig. 2 is a partial edge view of the same.

Referring to the drawings in detail, it will be seen that the wrench consists of a pair of arms 2 and 3, pivotally connected at their inner ends as at 4. The outer ends of the arms terminate in jaw sections 5 and 6, which are so formed that they will readily engage a rounded surface, such as a pipe, nipple or the like, or a nut or other member to be turned. A spring 7 is interposed between the arms to normally separate the same, said spring being secured to one of the arms as at 7ª in any suitable manner, and having its opposite free end engaging the opposite arm. The arms are connected by a rack member 8, which is pivotally attached to the arm 3, as at 9. The arm 2 is slotted, as at 10 to permit the rack member 8 to pass therethrough. In one end of the slot 10 is formed a pawl or keeper 11 with which the teeth of the rack bar are adapted to engage; the rack bar being held normally in engagement with the teeth of the pawl by a spring 12. Pivotally secured, as at 14, on the outer end of the rack bar, is a releasing lever 15. This lever is provided with a handle extension 16 and a cam projection 17, which normally engages the edge or outer surface of the arm 2.

In actual operation if it is desired to move the jaws together to engage a nut, pipe or other object, it is only necessary to grasp the arms and force them together. This will cause the jaws 5 and 6 to engage the object to be turned and the jaws will automatically become locked in this position as the teeth of the rack bar 8 will engage the teeth of the pawl 11 and thus secure the jaws against release. After the nut or other member has been turned, and if it is desired to spread the jaws, it is only necessary to press downwardly on the releasing lever 15 by engaging the lever extension 16. This causes the lever to rock about the cam extension 17 and thereby forces the rack bar 8 forward and upward, thus releasing the respective teeth on the rack bar and the pawl. The jaws or arms will then automatically expand as the normal tendency of the spring 7 is to separate the same. Any degree of separation within the limits or length of the rack bar may thus be automatically obtained.

The present wrench may be termed a "handy wrench," or "universal wrench," as it is intended for general utility and all-around use. As such is the case it is obvious that projections on the arms or jaws are objectionable. Such projections are in this case practically eliminated by curving the tooth and face of the pawl 11, and similarly the rack bar 8, that is as the jaws are moved toward each other, the rack bar 8 will swing rearwardly towards the pivot 4 and as such will not project to any material extent. The curvature given the rack bar is therefore of considerable importance.

The jaw sections 5 and 6 may be formed directly on the arms 2 and 3, or they may be secured with relation thereto to permit removal or replacement of the same. The pawl 11 may similarly be formed as an integral part of the arm 2, or secured therein. These features however do not form an important part of the present invention, as I obviously wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. A wrench comprising a pair of pivotally connected co-acting clamping jaws, a rack bar pivotally attached to one of said jaws, the other of said jaws having a slot formed therein through which the rack bar extends, said rack bar being curved, a pawl fixed in the slotted jaw, said pawl having a plurality of teeth and presenting a curved surface, a spring mounted in the slot and engageable with the rack bar to maintain the teeth of the rack bar and pawl in engagement, and a pivotally mounted cam member on the upper end of the rack bar manually operable to move the rack bar out of engagement with the pawl teeth.

2. A wrench comprising a pair of pivotally connected co-acting clamping jaws, a rack bar pivotally attached to one of said jaws, the other of said jaws having a slot formed therein through which the rack bar extends, said rack bar being curved, a pawl fixed in the slotted jaw, said pawl having a plurality of teeth and presenting a curved surface, and a trip lever pivotally secured to the outer end of the rack bar.

3. A wrench comprising a pair of pivotally connected co-acting clamping jaws, a rack bar pivotally attached to one of said jaws, the other of said jaws having a slot formed therein through which the rack bar extends, said rack bar being curved, a pawl fixed in the slotted jaw, said pawl having a plurality of teeth and presenting a curved surface, a trip lever pivotally secured to the outer end of the rack bar, said trip lever having a handle extension formed thereon, and a cam projection about which the tripping lever may be rocked to swing the rack bar into and out of engagement with the teeth of the pawl.

GEORGE ROBINSON.